US011610064B2

United States Patent
Yu et al.

(10) Patent No.: US 11,610,064 B2
(45) Date of Patent: Mar. 21, 2023

(54) CLARIFICATION OF NATURAL LANGUAGE REQUESTS USING NEURAL NETWORKS

(71) Applicant: ASAPP, INC., New York, NY (US)

(72) Inventors: Lili Yu, New York, NY (US); Tao Lei, Jersey City, NJ (US); Howard Chen, Jersey City, NJ (US); Sida Wang, Princeton, NJ (US)

(73) Assignee: ASAPP, INC., New York, NY (US)

( * ) Notice: Subject to any disclaimer, the term of this patent is extended or adjusted under 35 U.S.C. 154(b) by 266 days.

(21) Appl. No.: 16/582,700

(22) Filed: Sep. 25, 2019

(65) Prior Publication Data
US 2020/0184019 A1    Jun. 11, 2020

Related U.S. Application Data

(60) Provisional application No. 62/778,136, filed on Dec. 11, 2018, provisional application No. 62/777,434, filed on Dec. 10, 2018.

(51) Int. Cl.
| | |
|---|---|
| G06F 40/30 | (2020.01) |
| G06F 16/28 | (2019.01) |
| G06Q 30/016 | (2023.01) |
| G06N 3/04 | (2023.01) |

(52) U.S. Cl.
CPC ............ *G06F 40/30* (2020.01); *G06F 16/285* (2019.01); *G06N 3/0445* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 2016/0155445 A1* | 6/2016 | Selfridge | ............ | G10L 15/1822 704/249 |
| 2018/0173999 A1* | 6/2018 | Renard | ................ | G06K 9/6256 |
| 2018/0307724 A1* | 10/2018 | Shamsi | ................ | G06F 16/243 |

(Continued)

OTHER PUBLICATIONS

Chattopadhyay, et al., "Evaluating Visual Conversational Agents via Cooperative Human-AI Games", arXiv:1708.05122v1 [cs.HC], Aug. 17, 2017, 9 pages.

(Continued)

*Primary Examiner* — Quynh H Nguyen
(74) *Attorney, Agent, or Firm* — GTC Law Group PC & Affiliates

(57) ABSTRACT

A user of an automated natural language system may submit an ambiguous or incomplete request, and interactive techniques may be used to obtain clarification information from the user and then determine a response for presentation to the user. A user's initial request may be processed to compute a category score for each possible category of request. The category scores may be processed to determine if clarification of the request is needed. Where clarification is needed, one or more tags may be selected to determine a clarification question to be presented to the user. For example, a tag clarification score may be computed for each tag that indicates a value of the tag in clarifying the request. After receiving the clarification information from the user, one or more categories may be selected or, where needed, additional clarification information may be obtained.

19 Claims, 11 Drawing Sheets

(56) References Cited

U.S. PATENT DOCUMENTS

| | | |
|---|---|---|
| 2019/0128771 A1 | 5/2019 | Santarone et al. |
| 2020/0058238 A1 | 2/2020 | Davis |
| 2021/0073254 A1* | 3/2021 | Ghafourifar ........ G06F 16/3344 |

OTHER PUBLICATIONS

Chen, et al., "Learning-to-Ask: Knowledge Acquisition via 20 Questions", arXiv:1806.08554v1 [cs.AI], Jun. 22, 2018, 10 pages.

Das, et al., "Learning Cooperative Visual Dialog Agents with Deep Reinforcement Learning", Proceedings of the IEEE International Conference on Computer Vision, http://openaccess.thecvf.com/content_ICCV_2017/papers/Das_Learning_Cooperative_Visual_ICCV_2017_paper.pdf, 2017, pp. 2951-2960.

De Vries, et al., "GuessWhat?! Visual object discovery through multi-modal dialogue", Proceedings of CVPR, Honolulu, Hawaii, USA, http://openaccess.thecvf.com/content_cvpr_2017/papers/de_Vries_GuessWhat_Visual_Qbject_CVPR_2017_paper.pdf, 2017, pp. 5503-5512.

Gur, et al., "DialSQL: Dialogue Based Structured Query Generation", Proceedings of the 56th Annual Meeting of the Association for Computational Linguistics (Long Papers), Melbourne, Australia, Jul. 15-20, 2018., 2018, pp. 1339-1349.

Hancock, et al., "Training Classifiers with Natural Language Explanations", arXiv:1805.03818v4 [cs.CL], Aug. 25, 2018, 12 pages.

Hu, et al., "Playing 20 Question Game with Policy-Based Reinforcement Learning", arXiv:1808.07645v2 [cs.HC], Aug. 26, 2018, 10 pages.

Iyer, et al., "Learning a Neural Semantic Parser from User Feedback", arXiv: 1704.08760v1 [cs.CL], Apr. 27, 2017, 11 pages.

Lee, et al., "Answerer in Questioner's Mind for Goal-Oriented Visual Dialogue", arXiv:1802.03881v1 [cs.CV], Feb. 12, 2018, 10 pages.

Lei, et al., "Semi-supervised question retrieval with gated convolutions", Proceedings of the 2016 Conference of the North American Chapter of the Association for Computational Linguistics: Human Language Technologies, arXiv:1512.05726v2, Apr. 4, 2016, 12 pages.

Lei, et al., "Simple recurrent units for highly parallelizable recurrence", in Proceedings of the 2018 Conference on Empirical Methods in Natural Language Processing. Association for Computational Linguistics, arXiv:1709.02755v5 [cs.CL] Sep. 7, 2018, Sep. 7, 2018, pp. 15 pages.

Li, et al., "Dialogue Learning with Human-In-The-Loop", arXiv:1611.09823v3 [cs.AI], Jan. 13, 2017, 23 pages.

Lowe, et al., "The Ubuntu Dialogue Corpus: A Large Dataset for Research in Unstructured Multi-Turn Dialogue Systems", arXiv:1506.08909v3 [cs.CL] Feb. 4, 2016, Feb. 4, 2016, 10 pages.

Rao, et al., "Learning to Ask Good Questions: Ranking Clarification Questions using Neural Expected Value of Perfect Information.", arXiv:1805.04655v2 [cs.CL], Jun. 12, 2018, 10 pages.

Shah, et al., "Adversarial Domain Adaptation for Duplicate Question Detection", arXiv:1809.02255v1 [cs.CL], Sep. 7, 2018, 8 pages.

* cited by examiner

| Item Summary | Answer Text | Tags |
|---|---|---|
| Activate your new iPhone 8 | Here we explain how to activate your iPhone 8. First, ... | "activate" "new device" "iPhone 8" |
| Activate your new iPhone X | Here we explain how to activate your iPhone X. First, ... | "activate" "new device" "iPhone X" |
| Activate your new Galaxy S7 | Here we explain how to activate your Galaxy S7. First, ... | "activate" "new device" "Galaxy S7" |
| Activate your new Galaxy Note 9 | Here we explain how to activate your Galaxy Note 9. First, ... | "activate" "new device" "Galaxy Note 9" |
| How do I reset the password of my email account? | To reset the password of your account, you need to perform ... | "reset password" "email" |
| How do I reset my voicemail password? | To reset the password of your voicemail account, you ... | "reset password" "voicemail" |
| How do I reset the PIN of my Galaxy S7? | To reset the PIN of your Galaxy S7, you need to perform ... | "reset password" "phone" "Galaxy S7" |
| ... | ... | ... |

Fig. 2A

| Intent Name | Intent Descriptiopn | Tags |
|---|---|---|
| ADD_BOX | Users asking to add a cable box. | "activate" "cable box" "hardware" |
| RETURN_BOX | Users asking to return a cable box. | "return" "cable box" "hardware" |
| ADD_DVR | Users asking to add a digital-video recorder. | "add" "dvr" "hardware" |
| RETURN_DVR | Users asking to return a digital-video recorder. | "return" "dvr" "hardware" |
| ADD_REMOTE | Users asking to add a remote control. | "add" "remote" "hardware" |
| RETURN_REMOTE | Users asking to return a remote control. | "return" "remote" "hardware" |
| ... | ... | ... |

Fig. 2B

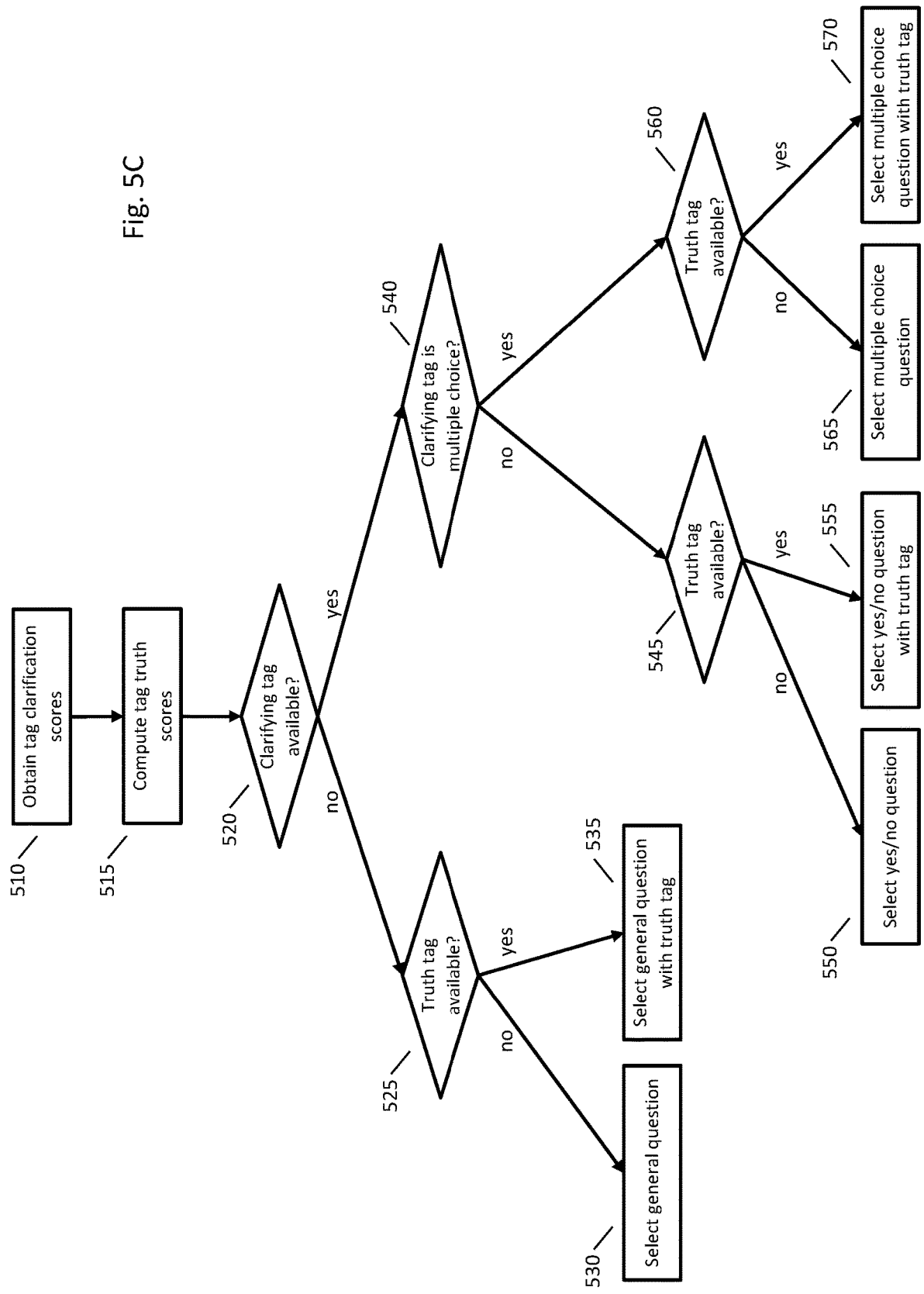

| Question Type | Clarifying Tag | Truth Tag | Question Template |
|---|---|---|---|
| General | | | Could you please explain in more detail? |
| General | | Action | What are you trying to <ACTION>? |
| General | | Object | How can we help you with <OBJECT>? |
| General | | Action, Object | How can we help you <ACTION> your <OBJECT>? |
| Yes/No | Action | | You are trying to <ACTION> something, correct? |
| Yes/No | Object | | This is regarding your <OBJECT>, correct? |
| Yes/No | Action | Object | Are you trying to <ACTION> your <OBJECT>? |
| Yes/No | Object | Action | Are you trying to <ACTION> your <OBJECT>? |
| Yes/No | Action, Object | | Are you trying to <ACTION> your <OBJECT>? |
| Multiple-Choice | Multiple-Choice | | Which <CHOICE> do you need help with: <CHOICE1>, <CHOICE2>, or <CHOICE3>? |
| Multiple-Choice | Multiple-Choice | Action | Which <CHOICE> would you like to <ACTION>: <CHOICE1>, <CHOICE2>, or <CHOICE3>? |
| … | … | | … |

Fig. 6

CLARIFICATION OF NATURAL LANGUAGE REQUESTS USING NEURAL NETWORKS

CLAIM OF PRIORITY

This application claims the benefit of U.S. Patent Application Ser. No. 62/777,434, filed Dec. 10, 2018, and entitled "INTERACTIVE INFORMATION RETRIEVAL USING NEURAL NETWORKS" (ASAP-0018-P01).

This application claims the benefit of U.S. Patent Application Ser. No. 62/778,136, filed Dec. 11, 2018, and entitled "INTERACTIVE INFORMATION RETRIEVAL USING NEURAL NETWORKS" (ASAP-0018-P02).

The content of each of the foregoing applications is hereby incorporated by reference in its entirety for all purposes.

BACKGROUND

People may use natural language to interact with automated natural language systems, such as when obtaining customer support from a company. A person may submit a natural language request, for example, in the form of text or speech. The request may be processed automatically and a response provided to the user.

An automated system that responds to natural language requests may provide benefits for both the user of the system and the company providing the system. For the user, the automated system may provide convenience for the user in that the user may be able to access the desired information more quickly than doing a more general search (e.g., an Internet search) or calling a telephone number to obtain the information from a person. For the company, an automated system may reduce expenses in providing information to customers in that the information may be provided automatically instead of hiring customer service representatives to assist users.

In some situations, a natural language request provided by a user may be missing important information to provide an accurate response back to the user. For example, a person may submit the following technical support request: "How do I reset my password?" The company may have multiple types of passwords for its customers (e.g., email, voicemail, smartphone PIN, etc.), and it may be difficult for the company to provide a useful response to the customer in light of the ambiguous request.

BRIEF DESCRIPTION OF THE FIGURES

The invention and the following detailed description of certain embodiments thereof may be understood by reference to the following figures:

FIG. 2A is an example set of information items for use with an information retrieval system.

FIG. 2B is an example set of natural language intents for use with an automated system.

FIGS. 5A-C are example methods for determining a clarifying question in an automated system.

FIG. 6 is an example set of question templates for an automated system.

DETAILED DESCRIPTION

Automated systems for processing natural language requests may be used in a variety of applications. For example, various personal assistants (e.g., Google Home, Alexa, or Siri) may allow users to submit requests to obtain information, such as the current temperature, stock prices, or the score of a game of a favorite sports team. In another example, a company may provide automated customer support to allow customers to obtain needed information without needing to call in and speak with a customer service representative. The techniques described herein may be used with any automated system for processing natural language requests, but for clarity of presentation an automated system for customer support will be used as an example. As such, a customer or other person may be considered a user of the system in embodiments. The techniques described herein may also be used with systems that are only partially automated, such as when automated techniques are used to clarify a user request before the user is connected with a person.

A person using an automated system, may submit a natural language request or query using any appropriate techniques. For example, a person may submit a request using speech (e.g., to a personal assistant) or using a text message. A text message includes any message sent as text including but not limited to a message sent using email, SMS (short message service) or a special-purpose application (e.g., Facebook messenger, Apple iMessage, Google Hangouts, or WhatsApp).

An automated system may allow a company to provide better support to customers. Automated systems may allow customers to access needed information more quickly and may also be less expensive than hiring customer support representatives to assist customers. Automated systems may allow, for example, customers to obtain information about services of the company, information about billing, or technical support.

Automated systems may be provided by a company using a variety of communication techniques, and the techniques described herein are not limited to any particular communication techniques. For example, a customer may submit a request by entering a text message or speaking, and the customer may send a request using any appropriate device, such as a computer, smart phone, tablet, wearable device, or Internet of things device. The customer may submit a request using any appropriate software or devices, such as using an app running on customer device (e.g., an app of the company or a third-party app created for processing customer requests), a web page, a text messaging client, or sending an email.

To improve the performance of an automated system, a company may desire to assist customers in clarifying their requests so that the company is able to provide relevant information to its customers. Accordingly, assisting customers in submitting requests to an automated system may provide benefits to both customers of the system and a company implementing the system.

Figure 1:
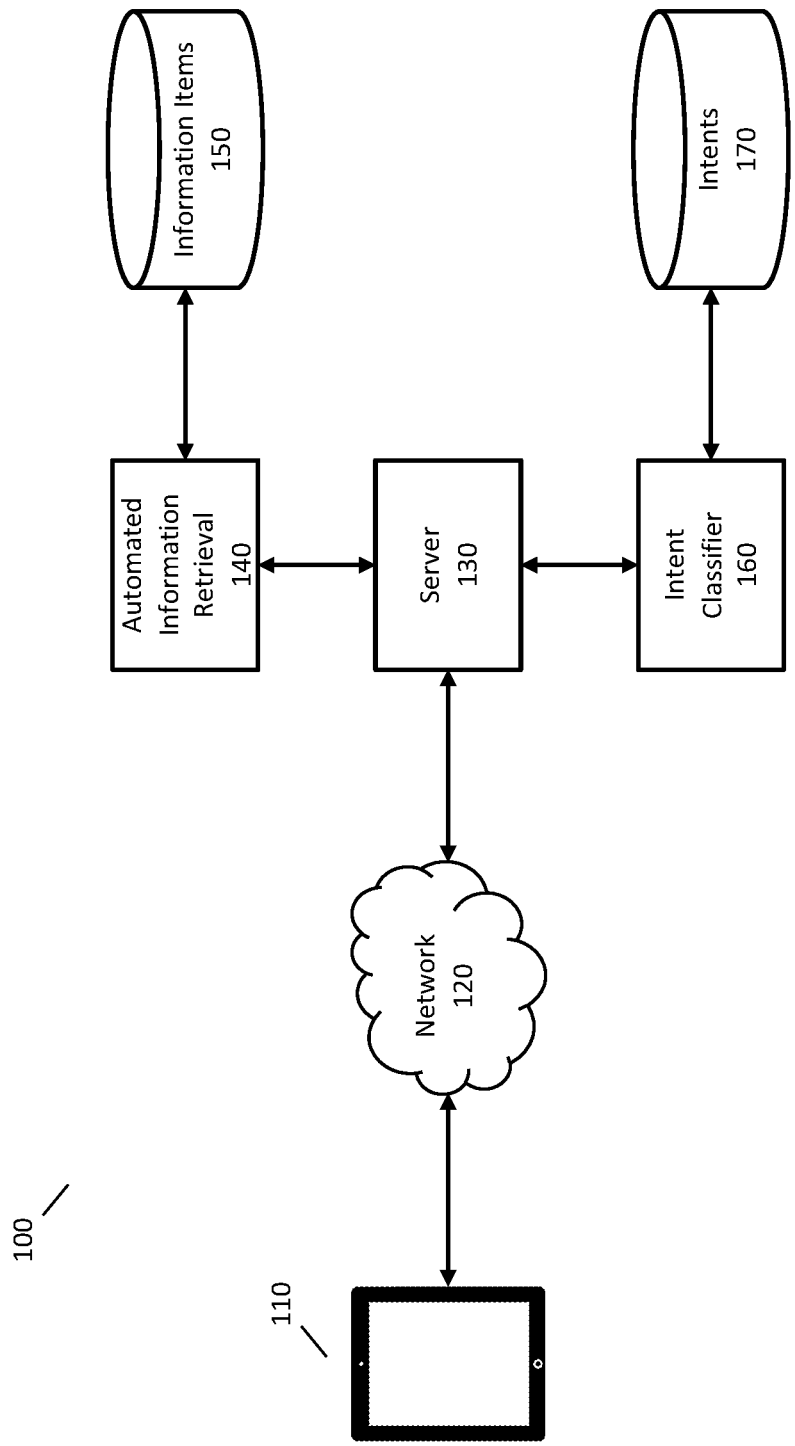
FIG. 1 is an example automated system that processes natural language requests.

FIG. 1 is an example system 100 for that processes natural language requests. In system 100, a user (not shown) may use user device 110 to transmit a request to a company. User device 110 may be any device that allows a user to transmit a request, such as a mobile device (e.g., a smart phone), and the request may be entered and transmitted using any appropriate techniques. The request may be transmitted, for example, as text or an audio signal of speech that may later be processed with speech recognition techniques.

The request may be transmitted to the company using network 120. Network 120 may include any appropriate communications network, such as the Internet, a mobile device network, a wide area network, or a local area network.

The company may receive the request from the user at server computer 130. Server computer 130 may implement any appropriate techniques for responding to the request, such as creating a network connection with user device 110, performing load balancing across multiple server computers, and so forth.

In some implementations, server computer 130 may use the services of automated information retrieval component 140 to provide a response to a request of the user. Automated information retrieval component 140 may perform operations to select one or more information items from information items data store 150 to use as a response to the request of the user. For example, automated information retrieval component 140 may identify one or more information items that are most relevant to the request of the user, determine when clarification of the user request is to be obtained from the user, and determining how to efficiently obtain clarification from the user.

In providing an automated information retrieval system, the company may have a number of information items that are available to provide responses to requests of users. For example, a company may determine requests that are likely to be made by users (e.g., by analyzing or processing existing logs of customer requests) and generate one or more information items for each request that may be transmitted to the user to provide the user with the requested information. The information items may be stored using any appropriate techniques, such as information items data store 150.

An information item may include one or more types of information. For example, an information item may be stored in a database that has multiple fields, columns, or properties for each information item.

In some implementations, an information item may include an item summary field that provides a concise summary or description of the information item. For example, the item summary field may be a phrase or sentence that describes the information provided by the information item, such as "Activate your new Galaxy S7". For another example, the item summary field may be a common question or request used to request that the information, such as "How do I activate my Galaxy S7 phone?"

In some implementations, an information item may include more than one item summary field. For example, an information item may include an item title field that describes the information item and an item question field that represents a common question used to request the information item.

In some implementations, an information item may include an answer text field that provides the information requested by the user. For example, where the user is seeking help in activating a Galaxy S7 phone, the answer text field may include instructions (e.g., a step by step process) to allow the user activate a Galaxy S7 phone. The answer text field may be stored in any appropriate format, such as plain text, rich text, XML, or HTML.

In some implementations, an information item may include a link field that includes a link (e.g., a URL or uniform resource locator) that allows the user to obtain the desired information. For example, the link may be to a page of the company's website that includes the requested information.

An information item may include any other appropriate fields that may be known to one of skill in the art and that may be used with an information retrieval system.

The data and text of the information items may be compiled using any appropriate techniques. In some implementations, existing data sources may be used to compile the information items. For example, a company may have an existing list of "frequently asked questions" (a FAQ list) and answers that may be used by customers to obtain answers to their questions or that may be used by customer service representatives in answering customer questions. For another example, a company may have a knowledge base that may be used by customers or customer service representatives to obtain answers to questions. Automated processing techniques (e.g., using regular expressions or neural networks) may be used to extract information from sources, such as a FAQ list or knowledge base, to obtain the data needed to create a list of information items for use in an interactive information retrieval system. For example, the question of an individual FAQ may be used as an item summary and the answer to the FAQ may be used as the answer text.

In some implementations, server computer 130 may use the services of intent classifier component 160 to provide a response to a request of the user. Intent classifier component 160 may perform operations to determine one or more natural language intents that correspond to the request of the user. Information about a set of possible intents may be stored, for example, in intents data store 170. For example, intent classifier component 160 may identify one or more intents that correspond to a user's request, determine when clarification of the user request is to be obtained from the user, and determining how to efficiently obtain clarification from the user.

A company implementing an automated system may categorize the messages or requests it expects to receive from customers into a number of specified intents. By categorizing messages into intents, it may be easier for the company to provide an automated response. For example, a YES intent may include a variety of ways of communicating agreement (e.g., "yes", "ok", "that's good", etc.). To provide a response, it may be sufficient to know the intent of the message, and the specific manner in which the intent was expressed may not be important.

To determine an intent of a request, a company may process the received request with a mathematical model, such as an intent classifier. The mathematical model may provide an output that indicates the intent of the request from a set of possible intents or that indicates that the request does not match any intent of the set of intents.

As used herein, an intent describes a set of natural language requests that have similar meaning. A company may define a set of intents (such as hundreds, thousands, or more intents), and the intents may be defined using any appropriate techniques. For example, an intent may be defined by a mathematical model that processes requests to determine intents of the requests or by a corpus of training data that was used to create the mathematical model. Because a concept may be expressed using a wide variety of language, a single intent may correspond to large number of requests.

An intent may be assigned a label to make it easier for humans to understand the types of messages corresponding to the intent. For example, a YES intent may include messages that express agreement, a NO intent may include messages that express disagreement, and a PAY_BILL intent may include messages that express a desire to pay a bill.

An intent classifier may be implemented using any appropriate techniques, such as any of the techniques described in U.S. patent application Ser. No. 16/189,584 or 16/189,613, each of which is incorporated by reference in their entireties for all purposes.

An automated system for processing natural language request may be implemented using any appropriate techniques and is not limited information retrieval techniques and determining natural language intents. More generally, an automated system may select one or more categories as corresponding to a natural language request from a set of possible categories. For example, the set of categories may be a set of available information items or a set of possible intents.

In some implementations, a category (e.g., an information item or an intent) may be associated with zero or more tags that are relevant to the category. A tag may correspond to any information that is relevant to assisting a user in clarifying a request to the automated system. For example, a tag may be represented by a word or phrase that is relevant to the natural language request. For a category relating to activating a Galaxy S7 phone, the tags associated with the category may include an "activate phone" tag and a "Galaxy S7" tag. In some implementations, a tag for a category may include one or more of an action tag (e.g., a verb or action to be performed by the user) or an object or subject matter tag (e.g., a noun or an object that is a subject matter of an action being performed).

In some implementations, the tags for each category may be determined by a person. A person may review each category and select one or more tags for each category. In some implementations, automated techniques, such as neural networks may be used to determine tags. For example, key noun and verb phrases may be automatically extracted from text of information items to be used as tags. Any appropriate techniques may be used for automated tagging, such as syntax analysis to obtain parts of speech or named entity recognition.

FIG. 2A illustrates an example representation of a list or set of available information items that may be used as categories. In FIG. 2A, each row represents an information item and each column contains data relating to the information item. In the example of FIG. 2A, each information item has a field for an item summary, a field for answer text, and a field for one or more tags. The information items of FIG. 2A may be stored using any appropriate techniques, such as in a database.

FIG. 2B illustrates an example representation of a list or set of available natural language intents that may be used as categories. In FIG. 2B, each row represents an intent and each column contains data relating to the intent. In the example of FIG. 2B, each intent has a field for an intent name, a field for an intent description, and a field for one or more tags. The intents of FIG. 2B may be stored using any appropriate techniques, such as in a database.

When a user submits a request, text of the request may be processed to determine which categories may correspond to the request. For example, as described in greater detail below, a category score (e.g., a likelihood or probability) may be computed for each category, and the category scores may be used to select a category (e.g., by selecting a highest scoring category).

Where a first category has a category score that is much higher than all of the other categories, then it may be clear that the first category corresponds to the user's request, and the first category may be used to respond to the user without obtaining any clarification.

Where the category score of a highest scoring category is close to category scores of other categories (e.g., multiple categories have category scores close to a highest category score), then it may be unclear which category corresponds to the user's request. For example, customers of the company may have different types of passwords (e.g., email, voicemail, smart phone PIN) so categories relating to each type of password may have a high score. Instead of selecting one category (which may be the wrong one), the automated system may use interactive techniques to obtain clarification from the user.

Where all of the category scores are low, the user may have submitted an ambiguous request or used unexpected language in the request that is not a good match for any of the categories.

For instances where it isn't clear which category corresponds to the user's request, it may be desired to ask the user for clarification so that the company may more accurately determine the category of the user's request. The tags corresponding to the categories may be used to determine a clarification question to obtain the needed clarification from the user.

In some implementations, as described in greater detail below, a tag clarification score may be computed for each tag that indicates the value of the tag in clarifying the user's request. In some implementations, a tag truth score may be computed for each tag that indicates a match between the user's request and the corresponding tag. The tag clarification scores and/or the tag clarification scores may be used to determine a clarification question to efficiently obtain the needed clarification from the user.

Figure 3B:
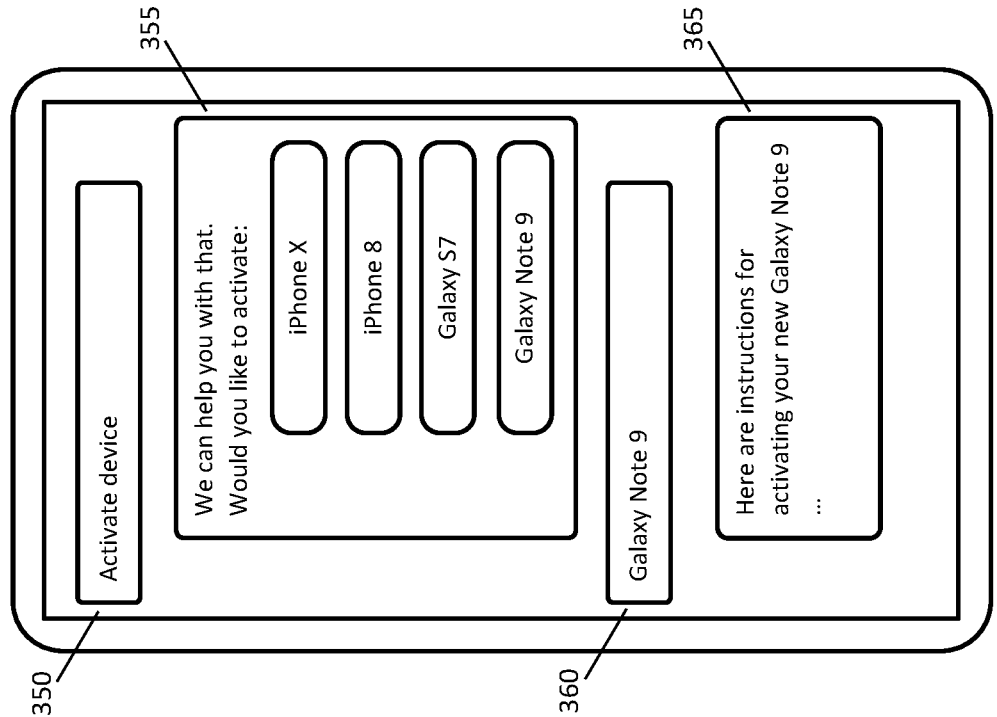
FIGS. 3A and 3B are example user interfaces for an automated system that processes natural language requests.
Figure 3A:
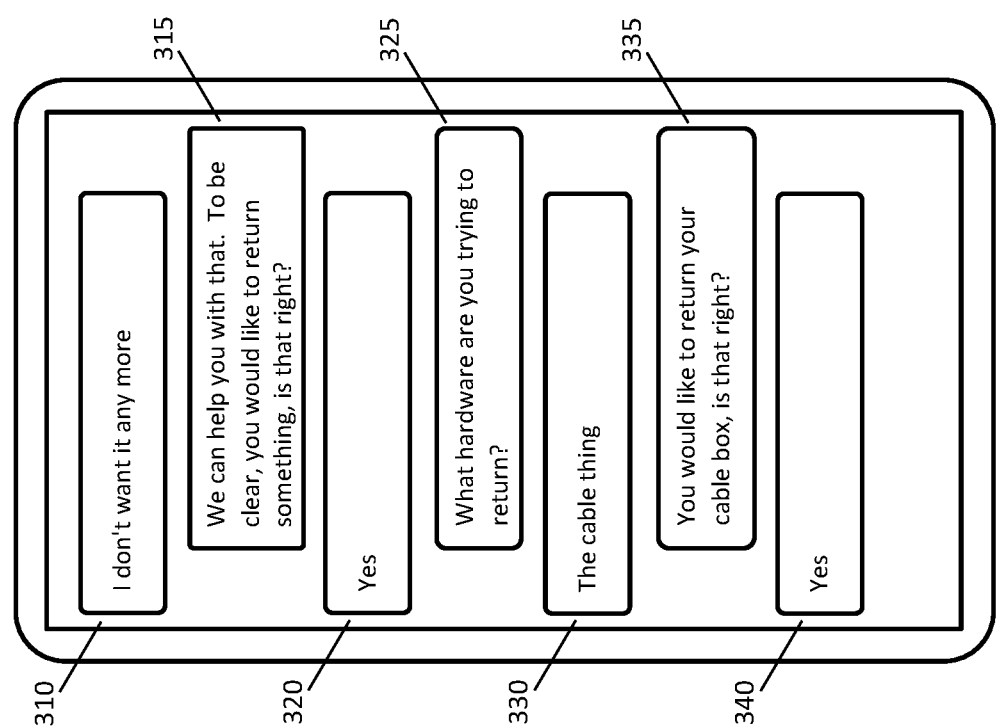

FIGS. 3A and 3B illustrate example user interfaces, such as a user interface presented on a smartphone or other device, that may be used with an automated system for processing a natural language request. The user interfaces of FIGS. 3A and 3B may be implemented using any appropriate communication techniques, such as any of the techniques described herein (e.g., SMS, email, smartphone app, etc.).

In FIG. 3A, the user interface corresponds to an automated system implemented using the intents of FIG. 2B. A user has submitted request 310 (e.g., by typing or speaking) that is ambiguous ("I don't want it anymore"). The company may determine that the request needs clarification by computing category scores for this request and determining that all the category scores are low. The company may then compute tag clarification scores and/or tag truth scores and select the tag "return" (which corresponds to intents 255, 265, and 275 of FIG. 2B) to clarify the request. The company may then use the "return" tag to determine an appropriate clarifying question, such as question 315 in FIG. 3A.

The user then responds with message 320 indicating that he would like to return something. Using message 320, the company may again compute category scores and determine that the request is still ambiguous. The company may again compute tag clarification scores and/or tag truth scores and select the tag "hardware" (which corresponds to all of the intents of FIG. 2B) to clarify the request. The company may use the "hardware" tag to determine an appropriate question, such as question 325 in FIG. 3A.

The user then responds with message 330 that provides unclear information about the product the user would like to return. Using message 330, the company may again compute category scores and determine that the request is still ambiguous. The company may again compute tag clarification scores and/or tag truth scores and select the tag "cable box" (which corresponds intents 250 and 255 of FIG. 2B) to clarify the request. The company may use the "cable box" tag to determine an appropriate question, such as question 335 in FIG. 3A.

The user then responds with message 340 that clarifies that the user would like to return a cable box. Using message 340, the company may again compute category scores and now determine that the request is clear and select intent 255 of FIG. 2B as corresponding to the user's request. The company may then use the selected intent to respond to the user, such as by presenting information about how to return a cable box or to connect the user with a customer service representative who can assist the user.

In FIG. 3B, the user interface corresponds to an automated system implemented using the information items of FIG. 2A. A user has submitted request 350 that relates to activating a device. The company may determine that the request needs clarification by computing category scores for this request and determining that categories 210, 215, 220, and 225 all have similar high scores. The company may then compute tag clarification scores and/or tag truth scores and select the tag "new device" to clarify the request. The company may then use the "new device" tag to determine an appropriate question, such as question 355 in FIG. 3B.

In some implementations, a tag may correspond to a boolean value (e.g., whether or not it corresponds to the user's request), and in some implementations, a tag may be multiple choice in that may take on multiple values. For example, the tag "new device" may be a multiple choice tag that may have any of the following values: "iPhone 8", "iPhone X", "Galaxy S7", or "Galaxy Note 9". Because the "new device" tag is multiple choice, the company may use a multiple choice question, such as question 355 in FIG. 3B.

The user then responds with message 360 that selects one of the options of question 355. Using message 360, the company may again compute category scores and now determine that the request is clear and select information item 225 of FIG. 2A as corresponding to the user's request. The company may then present information item 225 as message 365 in FIG. 3B.

Figure 4:
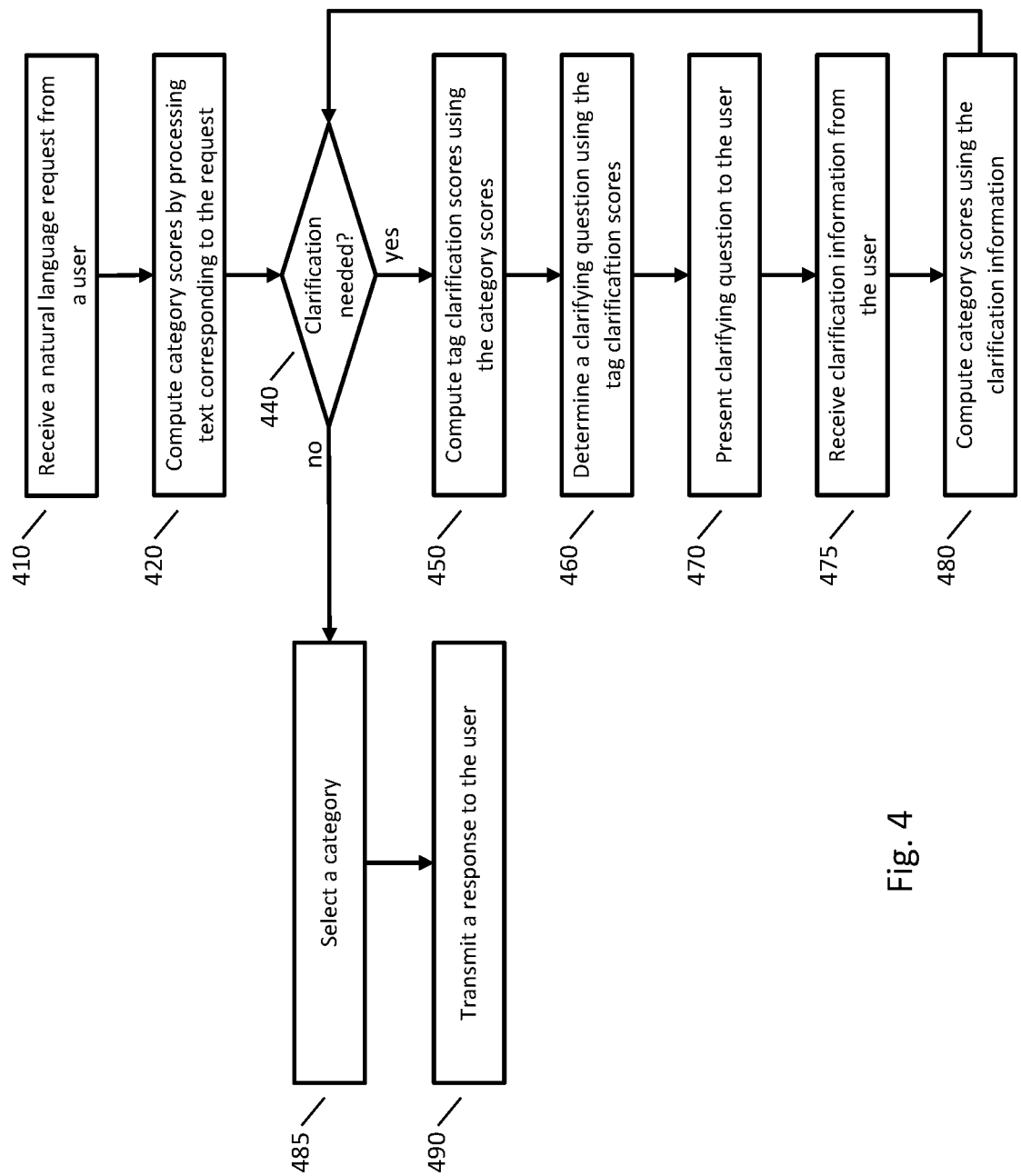
FIG. 4 is an example method for implementing an automated system that processes natural language requests.

Additional variations and details of an automated system that processes natural language requests are now described. FIG. 4 is a flowchart of an example method for implementing an automated natural language system.

At step 410, a natural language request is received from a user. The request may be received using any appropriate technology (e.g., SMS, email, customer support application), in any appropriate format (e.g., text or speech), and formulated as a sentence, a word or phrase, a question, a statement, or any other appropriate expression of natural language.

At step 420, text of the request is processed with a neural network to compute category scores that indicate a match between the request and each category of a set of categories. Any appropriate techniques may be used to compute category scores from the request.

In some implementations, the categories of the automated system correspond to information items, such as the information items of FIG. 2A. In such implementations, the text of the request may be processed with a neural network to compute a request vector that represents the meaning of the request. Any appropriate techniques may be used to compute a request vector using a neural network.

In some implementations, words of the text of the request may be processed to obtain a word embedding for each word of the request, and the word embeddings may then be processed with the neural network. A word embedding is a vector in an N-dimensional vector space that represents the word but does so in a manner that preserves useful information about the meaning of the word. For example, the word embeddings of words may be constructed so that words with similar meanings or categories are close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and a lookup may be performed to obtain a word embedding for each word of the request.

Any appropriate techniques may be used to compute word embeddings from a training corpus. For example, the words of the training corpus may be converted to one-hot vectors where the one-hot vectors are the length of the vocabulary and the vectors are 1 in an element corresponding to the word and 0 for other elements. The one-hot vectors may then be processed using any appropriate techniques, such as the techniques implemented in Word2Vec, GloVe, or fastText software. A word embedding may accordingly be created for each word in the vocabulary.

A neural network may then process the word embeddings to compute the request vector. For example, the neural network may sequentially process the word embeddings, and include one or more layers, such as a recurrent neural network layer (e.g., a recurrent neural network with long short-term memory). The neural network may be trained using any appropriate techniques, such as described in greater detail below.

The same neural network may have been used to compute an item vector for each item of a set of available information items (or in some implementations a different neural network may be used to compute the item vectors). An item vector may be computed from any appropriate text relating to the information item, such as the item summary and/or the answer text described above. For example, word embeddings may be obtained from text relating to the information item and the word embeddings may be sequentially processed with a neural network, such as a recurrent neural network.

A category score may then be computed for each of the available information items by comparing the request vector with the item vectors of the available information items. For example, a first category score for a first information item may be computing by comparing the request vector to a first item vector for the first information item. Any appropriate techniques may be used to compare a request vector to an item vector, such as computing a distance, an inner product, or a cosine distance. In some implementations, the category scores may be normalized so that they sum to one, such as by performing a softmax operation on the category scores.

In some implementations, the categories of the automated system may correspond to intents, such as the intents of FIG. 2B. In such implementations, the text of the request may be processed with a neural network to compute category scores where each category score corresponds to an intent. Any appropriate techniques may be used to compute category scores corresponding to intents.

In some implementations, category scores for intents may be computed using word embeddings for the words of the request as described above. The word embeddings may then be processed by a classifier. In some implementations, a classifier may be implemented using one or more neural network layers (such as a recurrent neural network layer) followed by logistic regression classifier. In some implementations, a prototype classifier may be used as described in the incorporated patent applications.

At step 440, it is determined if the request of the user provides sufficient information to determine the category of the request or if clarification of the request should be obtained. Any appropriate techniques may be used to determine if clarification is needed.

In some implementations, a rules-based approach may be used. For example, it may be decided that clarification is needed if the difference between the highest category score and the second highest category score is less than a threshold. In some implementations, a rule may compute a value that is a function of the highest score and the difference between the highest score and the second highest score and compare the value to a threshold. For example, the function may be difference divided by the highest score. In some implementations, an entropy of the category scores may be compared to a threshold. For example, it may be determined that clarification is needed if the entropy is greater than a threshold. In some implementations, a rule may be created by combining one or more of the above rules.

In some implementations, whether clarification is needed may be determined by processing the category scores with a second neural network that is referred to as a clarification neural network. For example, the clarification neural network may compute a clarification score, and it may be determined that clarification is needed if the clarification score exceeds a threshold. A clarification neural network for processing category scores to determine if clarification is needed is described in greater detail below.

If clarification is not needed, then processing proceeds to step 485 where one or more categories are selected. For example, a highest scoring category may be selected or all categories with a category score above a threshold may be selected. At step 490, a response is provided to the user. For example, for an information retrieval system, answer text of the items (where the items correspond to the selected categories) may be transmitted to the user or other information may be transmitted to the user to allow the user to obtain the answer text (e.g., providing a URL to access the answer text).

If clarification is needed, then processing proceeds to step 450. At step 450, tag clarification scores are computed for one or more tags, where a tag clarification score indicates the utility of the tag in clarifying the user's request. Any appropriate techniques may be used to compute tag clarification scores. In some implementations, a tag clarification score is computed for each tag, and in some implementations, a tag clarification score is computed for a subset of the tags, such as the tags corresponding to a number of categories with the highest category scores.

In some implementations, a tag clarification score may be computed by counting the number of times a tag appears for a number of highest scoring categories (e.g., all categories with a category score above a threshold or all categories whose category scores are sufficiently close to a highest category score). For example, in the example of FIG. 3B above, categories 210, 215, 220, and 225 may have the highest scores. Of the tags corresponding to these items, the tag "activate device" would get a score of 4, the tag "new device" would get a score of 4, and each of the other tags would get a score of 1.

In some implementations, a tag clarification score may be computed as an expected change in entropy of the category scores corresponding to the tag. Let f denote the category scores. The entropy of the category scores given the user's request may be computed, for example, as:

$$H(f) = \sum_{i=1}^{N} -f_i \log f_i$$

where N is the number of categories and $f_j$ is the category score of the $i^{th}$ category.

Where all category scores have the same value (e.g., 1/N), then each of the categories is equally relevant to the user's request and the user's request does not have any information that is useful for selecting a category. In this situation, the entropy of the item scores has its highest possible value. Where the category score for a first category is 1 and the other category scores are all 0, then the first category is clearly relevant to the user's request, and no clarification is needed. In this situation, the entropy of the category scores has its lowest possible value. In practice, the two extremes of entropy of category scores are unlikely to happen, but a goal for selecting tags may be to choose tags to decrease the entropy of the category scores as much as possible. Accordingly, for each tag, a tag clarification score may be computed using the expected change in entropy that takes into account the possibility of the user selecting the tag or not selecting the tag.

Denote the tags as $T_j$ for j from 1 to M. A tag clarification score may then be computed from the expected change in the entropy of the category scores conditioned on the tag as follows $$C_j = H(f) - E[H(f|T_j)]$$

where is the tag clarification score and E indicates expected value. Because the first term is the same for all of the tags, a tag clarification score may instead be computed as $$C_j = E[H(f|T_j)]$$

and the tag with the highest tag clarification score is expected to have the largest utility or value in clarifying the user's request.

Where the tags have boolean values (e.g., true or false), the tag clarification scores may be computed, for example, as $$C_j = P(T_j = \text{True}) \times H(f|T_j = \text{True}) + P(T_j = \text{False}) \times H(f|T_j = \text{False})$$

The value of $H(f|T_j = \text{True})$ may be computed by setting the category scores to 0 for categories that do not have tag $T_j$ and renormalizing the remaining category scores. The value of $H(f|T_j = \text{False})$ may be computed by setting the category scores to 0 for categories that do have tag $T_j$ and renormalizing the remaining category scores. The probability $P(T_j = \text{True})$ may be computed as $$P(T_j = \text{True}) = \sum_{i=1}^{N} P(T_j = \text{True}, f_i)$$

$$= \sum_{i=1}^{N} P(T_j = \text{True} \mid f_i) \times P(f_i)$$

$$= \sum_{i=1}^{N} P(T_j = \text{True}) \times P(f_i)$$

and $P(T_j=\text{False})=1-P(T_j=\text{True})$. The probability $P(f_i)$ may be referred to as a belief score or a truth score for the $i^{th}$ category given the request (and, in subsequent iterations, given any clarification information received from the user). The above process may be extended to tags without binary values, such as by using a multinomial distribution over tags.

Accordingly, after step 450, a tag clarification score is available for all tags or a subset of the tags.

At step 460, a clarification question is determined using the tag clarification scores. A clarification question may include any appropriate text and may include other forms, such as a multiple choice question.

In some implementations, one or more clarifying tags are selected using the tag clarification scores. Any appropriate techniques may be used to select the clarifying tags. For example, all tags with a clarification score above a threshold may be selected or tags with a tag clarification score that are sufficiently close to a highest tag clarification score may be selected. A clarification question may, for example, ask the user if one or more tags apply to the user's request or may ask the user to select one or more tags as corresponding to the request.

In some implementations, a question or a question template may be retrieved from a set or list of possible questions or question templates using the tag clarification scores, such as described in greater detail below.

At step 470, the clarification question is presented to the user, such as in the examples of FIGS. 3A and 3B.

At step 475, clarification information is received from the user. The clarification information may include any information that clarifies the initial request of the user. For example, the clarification information may be information that indicates that one or more choices of a multiple-choice question were selected by the user. For another example, the clarification information may be natural language received from the user as text or speech.

At step 480, the category scores are updated using the clarification information.

In some implementations, where the categories correspond to information items, an original request vector was computed by processing the text of the request with a neural network. The updated request vector may be computed by processing both the text of the request and text of the clarification information with a neural network. For example, a list of word embeddings may be obtained for the text of the request and the text of the clarification information, and these word embeddings may be processed by the neural network to compute an updated request vector. In some implementations, the state of the neural network from step 410 may be saved and accordingly, the text of the original request may not need to be reprocessed, and the neural network may process the text of the clarification information using the saved state. The category scores may then be updated using the updated request vector as described above.

In some implementations, where the categories correspond to intents, text of the request and text of the clarification information may be processed with a neural network to compute updated category scores. In some implementations, the state of the neural network from step 410 may be saved and accordingly, the text of the original request may not need to be reprocessed, and the neural network may process the text of the clarification information using the saved state.

After step 480, processing returns to step 430 where it is again determined if further clarification information is needed from the user. If further clarification information is needed, then processing proceeds to step 450 to repeat the clarification process. If further clarification is not needed, then processing proceeds to step 485 where one or more categories are selected and to step 490 where a response is presented to the user.

Clarification may be performed as many times as needed to provide the information requested by a user. For some automated systems, the types of information available may be complex and accordingly detailed information may be needed from the user. In some implementations, if a step of the clarification does not actually clarify the user's request (e.g., the entropy of the item scores gets worse or doesn't change significantly), then the user may be connected with a customer service representative to receive further assistance.

Figure 5A:
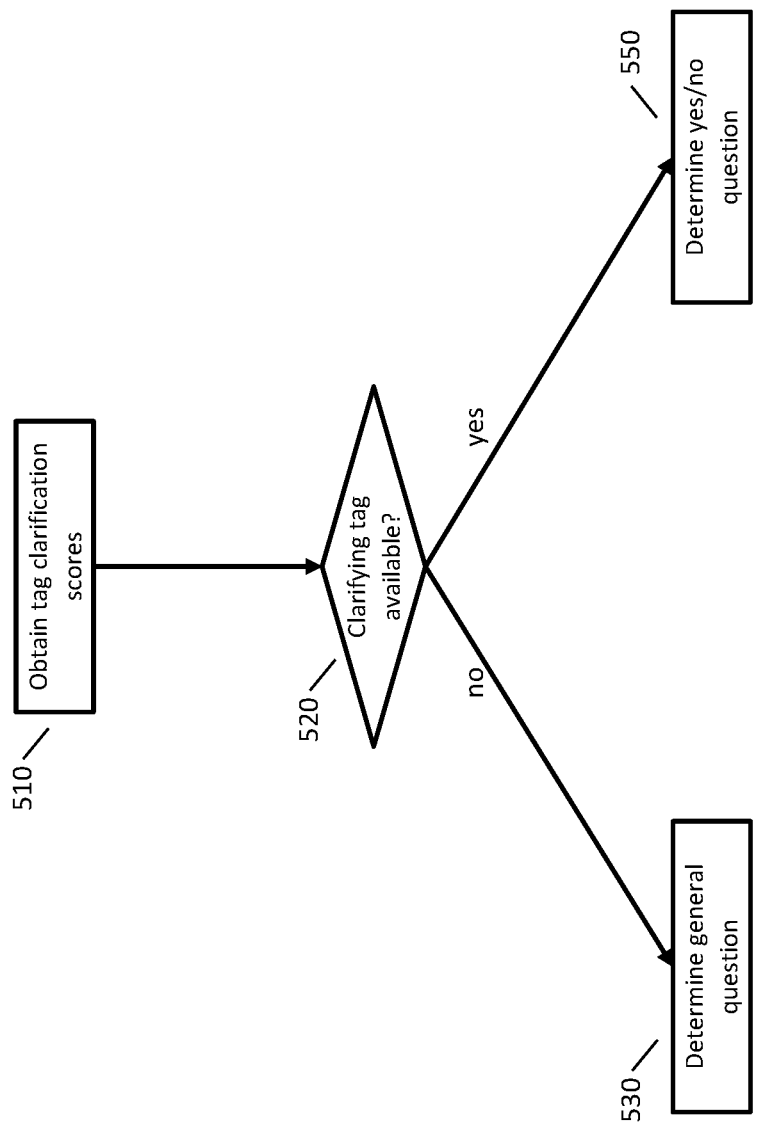

FIG. 5A is an example method for determining a clarifying question using tag clarification scores in an automated system. The method of FIG. 5A may be used, for example, at step 460 of FIG. 4.

At step 510, tag clarification scores are obtained. For example, the tag clarification scores may be obtained as described at step 450 of FIG. 4.

At step 520, it is determined whether any tag has a sufficiently high clarification score to be used to clarify a request of the user. For example, for an unclear request like "hello" or "I need help", all of the tag clarification scores may be low, and thus none of the tags may be helpful in clarifying the user's request. Any appropriate techniques may be used to determine whether a clarifying tag is available, such as comparing the tag clarification scores to a threshold.

Where no tags are available to clarify the user's request, then processing may proceed to step 530, where a general question is selected for presented to the user. For example, a general question may be "How can we help you today?" or "Can you explain in more detail?"

Where a tag is available to clarify the user's request, then processing proceeds to step 550, where a yes/no question (or another type of question that is not a yes/no question) is determined using the clarifying tag. For example, a question may be selected from a list of possible questions. For example, the list of questions may include the question "You are trying to activate something, correct?" where this question is associated with the "activate" tag. Accordingly, where the clarifying tag is "activate", this question may be selected from the list.

In some implementations, the number of questions that may need to be stored may be reduced using question templates and by associating the tags with different types. For example, a tag may have a type, such as being an action tag or an object tag as described above.

As illustrated in FIG. 6, a question template may then be created for each type of tag. For example, where we are selecting a yes/no question and the clarifying tag is an action tag, then the question template "You are trying to <ACTION> something, correct?" may be selected. A question may be determined by replacing the slot or variable <ACTION> with the name of the tag to obtain the question "You are trying to activate something, correct?"

Figure 5B:
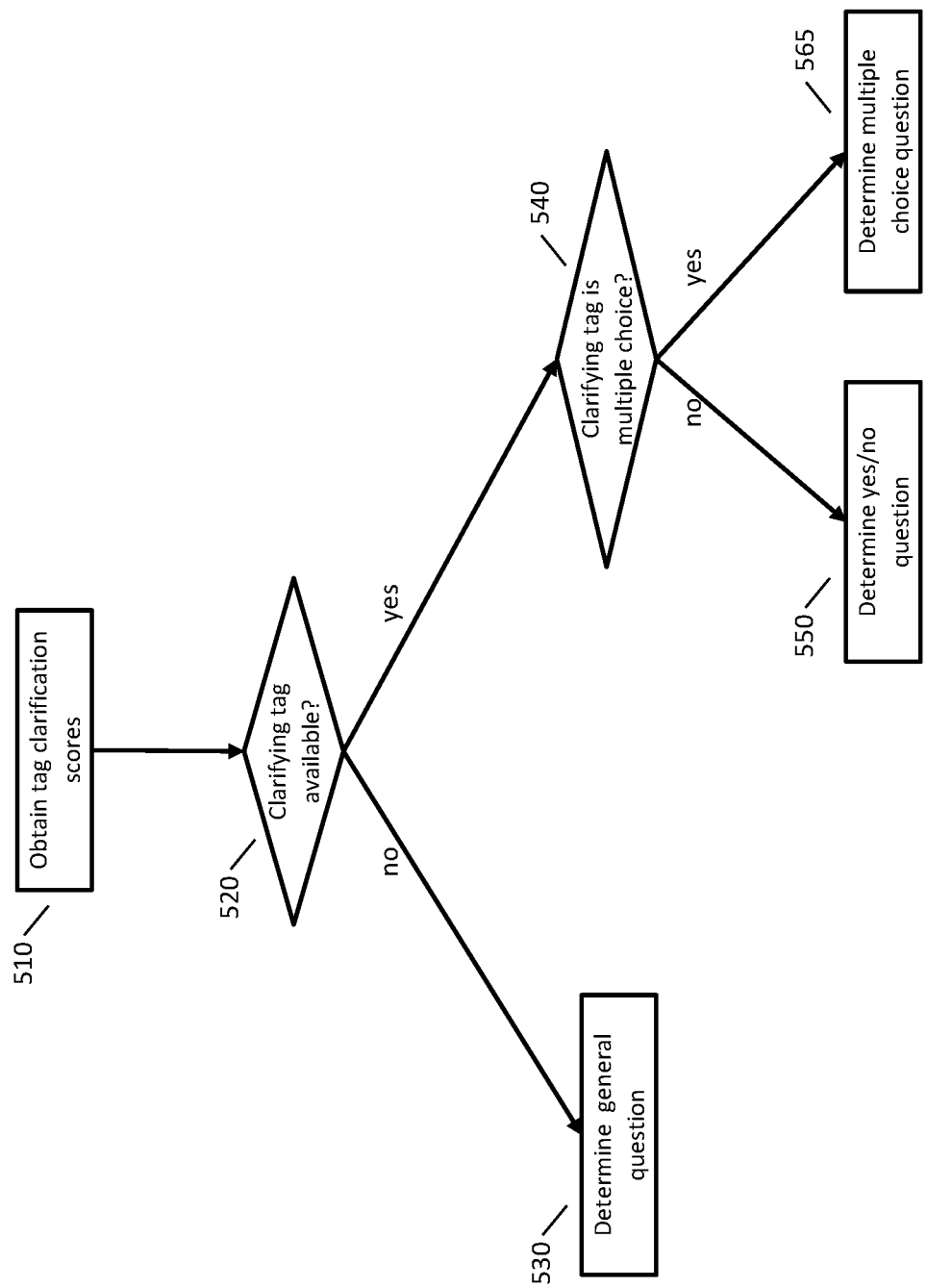

FIG. 5B is an extension of the method of FIG. 5A that allows for some tags to be multiple choice tags that correspond to multiple choice questions. In FIG. 5B, steps 510, 520, 530 and 550 may be implemented as described above.

In FIG. 5B, after determining that a clarifying tag is available, processing proceeds to step 540, where it is determined if the clarifying tag is a multiple choice tag. A multiple choice tag may allow for a clarifying question that is a multiple choice question instead of a yes/no question, and in some instances, a multiple choice question may be more efficient than a yes/no question in obtaining clarification information from the user. Any appropriate techniques may be used to determine that a tag is a multiple choice tag. For example, information about tags may be stored in a database and the database may include a field that indicates if a tag is a multiple choice tag.

Where the clarifying tag is not multiple choice, processing proceeds to step 550 where a yes/no question (or, in some implementations, a different type of question) is selected as described above.

Where the clarifying tag is multiple choice, processing proceeds to step 565 where a multiple choice question is selected. For example, a question may be selected from a list of possible questions, where the list indicates which questions correspond to multiple choices. For example, the "new device" tag may be a multiple choice tag that corresponds to the choices iPhone 8, iPhone X, Galaxy S7, or Galaxy Note 9. The list of questions may include the question "Which new device do you need help with: iPhone 8, iPhone X, Galaxy S7, or Galaxy Note 9?" where this question is associated with the "new device" tag. Accordingly, where the clarifying tag is "new device", this question may be selected from the list.

Question templates may also be used with categorical tags to reduce the number of questions that need to be stored. In some implementations, the number of questions that may need to be stored may be reduced using question templates and by associating the tags with different types. For example, a tag may have a type that indicates that the tag corresponds to a multiple choice question.

Returning to FIG. 6, a question template may then be created for multiple choice tags. For example, where the clarifying tag is a multiple choice tag, then the question template "Which <CHOICE> do you need help with: <CHOICE1>, <CHOICE2>, <CHOICE3>, or <CHOICE4>?" may be selected. A question may be determined by replacing the variable <CHOICE> with the name of the tag and replacing <CHOICE1> to <CHOICE4> with the choices for the tag to obtain the question "Which new device do you need help with: iPhone 8, iPhone X, Galaxy S7, or Galaxy Note 9?" The number of choices in the template may be varied to correspond to the number of choices for a multiple choice tag.

In some implementations, the clarifying questions that are presented to a user may be improved by using information that is already known about the user's request or believed to be true about the user's request. For example, in FIG. 3B, the user provided the request "Activate device." Using the process described above, a clarifying question may be determined as "Which new device do you need help with: iPhone 8, iPhone X, Galaxy S7, or Galaxy Note 9?" In this instance, however, the user has already indicated that he would like to activate a device. Because the request states that it relates to activation, a more specific clarifying question may be asked, such as "Which new device would you like to activate: iPhone 8, iPhone X, Galaxy S7, or Galaxy Note 9?" A more specific question like this may provide a better experience for the user because it may be closer to a question that would be asked by a person. Tags may also be used to improve the specificity of questions, and these tags may be referred to as truth tags or belief tags.

FIG. 5C is an extension of the method of FIG. 5B that uses truth tags to improve the specificity of clarifying questions. In some implementations, the truth tags may also be used with the method of FIG. 5A (e.g., without multiple choice questions). In FIG. 5C, steps 510, 520, 530, 540, 550, and 565 may be implemented as described above.

At step 515, tag truth scores are computed. A tag truth score is a score that indicates a match between a tag and a user request. For example, for the tag "activate" (show in FIG. 2B), a tag truth score indicates how likely it is that a user request indicates that it relates to activate something. Where a request explicitly mentions activation, (e.g., "I would live to activate my phone") then the tag truth score for the "activate" tag may be high. Where a request has nothing to do with activation (e.g., "I would like a copy of my bill"), then the tag truth score for the "activate" tag may be low.

Any appropriate techniques may be used to compute tag truth scores for tags. In some implementations, tag truth scores may be computed using a classifier, such as a neural network classifier. A classifier that computes tag truth scores may be trained using any appropriate techniques. For example, a corpus of training data may be obtained where the corpus includes requests and for each request, zero or more tags that correspond to the request. A classifier may be trained using this corpus, for example, by training a neural network using stochastic gradient descent.

In some implementations, the tag truth scores may be computed using the category scores. Each category may correspond to zero or more tags (e.g., as shown in FIGS. 2A-B) and each category has a category score, such as the category scores described above. For example, tag truth scores may be computed as:

$$t_i = \sum_{i=1}^{N} I_{i,j} C_j$$

where $t_i$ is a tag truth score for the $i^{th}$ tag, $C_j$ is a category score for the $j^{th}$ category, and $I_{i,j}$ is an indicator function that is 1 if category j has tag i and 0 otherwise. In some implementations, the tag truth scores may by normalized, such as normalizing the tag truth scores to sum to 1.

In FIG. 5C, at steps 525, 545, and 560 it is determined whether any tag has a sufficiently high tag truth score to be used to determine a clarifying question to be presented to a user. Any appropriate techniques may be used to determine whether a truth tag is available, such as comparing the tag truth scores to a threshold.

Where no truth tags are available, then processing may proceed to step 530, 550, or 565 as indicated in FIG. 5C, and a clarifying question may be determined as described above.

Where a truth tag is available, then processing may proceed to step 535, 555, or 570 as indicated in FIG. 5C. At steps 535, 555, and 570, a clarifying question is determined using the truth tag. In some implementations, a list of questions may be augmented to include all possible variants of truth tags with the other clarifying question selection criteria described above. In some implementations, a list of question templates may be augmented to include additional templates for all possible variants of truth tags with the other selection described above.

FIG. 6 includes examples of question templates that may include truth tags. For example, for the request "Activate device" of FIG. 3B, it may be determined that the "new device" tag is a clarifying tag that is also a multiple choice tag and that the "activate" tag is a truth tag that is also an action tag. Using this information, row 611 may be selected from the table of FIG. 6 because the clarifying tag is a multiple choice tag and the truth tag is an action tag. Accordingly, the question template "Which <CHOICE> would you like to <ACTION>: <CHOICE1>, <CHOICE2>, or <CHOICE3>?" may be selected. After filling the slots or variables of the question template, the following question may be determined: "Which new device would you like to activate: iPhone 8, iPhone X, Galaxy S7, or Galaxy Note 9?"

In some implementations, multiple clarifying tags and/or multiple truth tags may be available to select a clarifying question. In some instances, no clarifying tags may be available, but more than truth tag may be available. For example, where the available truth tags include an action tag and an object tag, question template 604 may be selected from the table of FIG. 6. In some instances, more than one clarifying tag may be available, and no truth tags may be available. For example, where the available clarifying tags include an action tag and an object tag, question template 609 may be selected from the table of FIG. 6. Any combination of clarifying tags and truth tags may be used to select a clarifying question, including one or more of each.

Neural Network Training

Further details of training a neural network to compute request vectors and item vectors of an information retrieval system are now described. The neural network may be trained so that a request vector for a user request is close to an item vector for the information item that best matches the request.

The training data for training the neural network may include a set of requests that have been labeled with an indication of the information item that is a best match for the request. Any appropriate techniques may be used to obtain the training data. In some implementations, existing customer support logs may be used to obtain the training data. The customer support logs may include an indication of when a customer service representative used an information item in assisting a customer, and the customer's messages may be used as example requests for the corresponding information item. In some implementations, people may be provided with an information item and be asked to generate text of the request that they would use when needing the information of the information item. In some implementations, people may be asked to paraphrase requests generated by users or paraphrase the text of information items to better capture variability in language used to express requests and the information of information items.

The training of the neural network may comprise multiple rounds where each round updates the parameters of the neural network by minimizing a loss function using, for example, stochastic gradient descent. At each round, a number of information items may be sampled (e.g., randomly). For each sampled information item, a request corresponding to the information item may also be sampled. An item vector for each sampled information item and a request vector for each sampled request may be computed using the current parameters of the neural network.

A matrix F may be computed by stacking the item vectors, and a matrix R may be computed by stacking the request vectors. These matrices may be created such that the first row of R is a request vector that corresponds to an item vector in the first row of F. Item scores (or a category score for an information item) may be computed for each pair of information items and requests as follows:

$$S = \text{softmax}(R \times F^T)$$

where softmax indicates a softmax operation performed over the rows of the matrix and the superscript T indicates a matrix transpose.

Each element of the matrix S is an item score for a corresponding request and information item. The diagonal elements of S are item scores for an information item that is a match to the corresponding request, and the off-diagonal elements are scores for an information item that is not a match to the corresponding request. Accordingly, the training process may update the parameters of the neural network to increase the scores of the diagonal elements and decrease the scores of the off-diagonal elements.

A loss function may be computed from the diagonal elements as follows $$L = \sum_i -\log S_{i,i}$$

Stochastic gradient descent may then be performed to minimize the value of the loss function.

The above training process is just one example of how a neural network may be trained to select an information item for a request of a user. The techniques described herein are not limited to this example, and any appropriate techniques for training a neural network may be used.

Reinforcement Learning

In the description of step 440 of FIG. 4 above, one example of a technique for determining whether clarification of a user request is needed is to process the clarification scores with a clarification neural network. Further details of using and training a clarification neural network to determine when clarification of a user request is needed are now described.

A clarification neural network may be trained to process the category scores computed at step 420 of FIG. 4 (or a subset of them, such as a number of highest category scores) and output a clarification score or probability indicating whether clarification should be requested from a user. For example, the clarification score may range from 0 to 1 and no clarification may be needed if the clarification score is greater than 0.5. Any appropriate type of neural network may be used for a clarification neural network. In some implementations, a clarification neural network may include a multi-layer perceptron and an activation function, such as a sigmoid activation function.

In some implementations, labeled training data may not be available to train a clarification neural network. Accordingly, techniques such as reinforcement learning or a policy gradient algorithm may be used to train the clarification neural network.

A clarification neural network may be trained using reinforcement learning and a training corpus of pairs of user requests and categories, where for each pair, the category corresponds to the user request. This training data may be obtained using any of the techniques described herein. The training process may simulate how an actual user would use the automated system. For example, where it is decided to request clarification from a user, the response of the user (e.g., the selection of one or more tags) may be simulated to continue the training process.

In training the clarification neural network, the training process may iterate over pairs of user requests and categories. For each pair, the performance of the clarification neural network may be evaluated and a reward score may be assigned that indicates if the clarification neural network performed well (high or positive reward) or performed poorly (low or negative reward). These rewards may be used to update the clarification neural network. The clarification neural network may be initialized using any appropriate techniques (e.g., random values), and then updated by iterating over the training data and updating the clarification neural network using the reward scores.

The processing of a pair of a first user request and corresponding first category may proceed as follows. Text of the first user request may be processed as described above to compute a category score for each available category. The clarification neural network may process all or a subset of the category scores and output a clarification score, such as a score between 0 and 1. During training, randomness may be introduced into the decision to clarify by sampling the clarification score. For example, if the clarification score is 0.9, then there is a probability of 0.9 that clarification is requested.

Where clarification is not requested, then a highest scoring category may be selected. Where clarification is requested, then one or more tags may be selected to determine a question to present to a user as described above. Because the training process is automated, the response of the user may be simulated. For example, the probability of each tag may be determined given the first category of the training iteration (this may be computed using the set of categories and/or the training data). The user simulator may select the tag with the highest probability given the first category (or sample from the tags using the tag probabilities), and the process may continue as described by FIG. 4. For example, second category scores may be computed using the clarification information received from the user and a clarification decision may be made using the second category scores and the clarification neural network. This process may be repeated until it is decided that clarification is not needed or until a maximum number of clarification requests have been performed (e.g., 5 clarification requests).

For a training iteration, each clarification decision by the clarification neural network may be referred to as a step. For example, if the first clarification decision is not to request clarification, then the training iteration has only one step. If the first clarification decision is to request clarification and the second clarification decision is to not request clarification, then the training iteration has two steps.

A reward score may be determined for each step of a training iteration. If a step of the training iteration corresponds to not requesting clarification and selecting one or more highest scoring categories, then the reward score may depend on whether the selected category matches the first category of the training iteration. If the selected category is a match, then the step may receive a positive reward score (e.g., 20). If the selected category is not a match, then the step may receive a negative reward score (e.g., -10). If the step of the training iteration corresponds to requesting clarification, then a smaller negative reward score may be applied (e.g., -1) to discourage too many requests for clarification.

A loss score for the training iteration may be computed using the rewards for each step. In some implementations, a loss score may be computed as $$L = \sum_{t=1}^{T} R_t \log(p_t)$$

$$R_t = \sum_{k=0}^{T-t} r_{t+k}$$

where T is the number of steps, $r_t$ is the reward score for a step, and $p_t$ is the probability of the action performed during the step (e.g., the clarification score computed by the clarification neural network or one minus the clarification score). In some implementations, a loss score may by computed using discounted reward scores, $R_t$, as follows:

$$L = \sum_{t=1}^{T} R_t \log(p_t)$$

$$R_t = \sum_{k=0}^{T-t} g^k r_{t+k}$$

where g is a discount value between 0 and 1.

A discounted reward score for a step allows the reward of a step to adjusted to take into account downstream results. For example, where clarification is requested at a first step, the first step receives a reward score of -1. If the second step results in the selection of a correct category, then the second step receives a reward score of 20. The first step facilitated the positive result of the second step, and discounted reward scores thus allow the reward score for the first step to be positively adjusted to correctly indicate that it was a good decision.

Any appropriate training techniques may then be used to update the clarification neural network using the loss score. For example, gradient descent may be applied to update the parameters of the clarification neural network. In some implementations, the training data may be processed in batches. For example, a loss score may be computed for each training iteration of a batch of training iterations, and the batch of loss scores may be applied simultaneously to update the clarification neural network.

In some implementations, the neural network used to compute the category scores (and referred to now for clarity as an encoding neural network) may also be updated during the training process for the clarification neural network. The parameters of the encoding neural network may be updated, for example, by performing back propagation on the encoding neural network using the gradient from the clarification neural network.

In some implementations, an automated system may be deployed without using a clarification neural network for making clarification determinations. For example, a rule-based approach may be used to make clarification determinations. Usage data of the deployed automated system may be collected to determine when good decisions were made (that should be rewarded) and bad decisions were made (that should be penalized). For example, at the end of a session with a user, the user may be asked to rate the performance of the system (e.g., with a thumbs up or thumbs down). For another example, it may be presumed that the system performed well when a customer received a response to a request with less than a threshold number of clarifications. For another example, it may be presumed that the system didn't perform well if the user abandoned (e.g., did not respond to a clarification request), the number of clarification requests was greater than a threshold, or the user needed to be connected to a customer service representative to obtain the needed information. Each of these outcomes may be associated with a reward score to further train the clarification neural network and/or the encoding neural network.

After deploying a clarification neural network and/or the encoding neural network that was trained using reinforcement learning, the same types of usage data may be used to further train the clarification neural network and/or the encoding neural network to further improve the performance of the automated system. For example, retraining using usage data may be performed on regular intervals, such as a once a week or once a month.

Implementation

Figure 7:
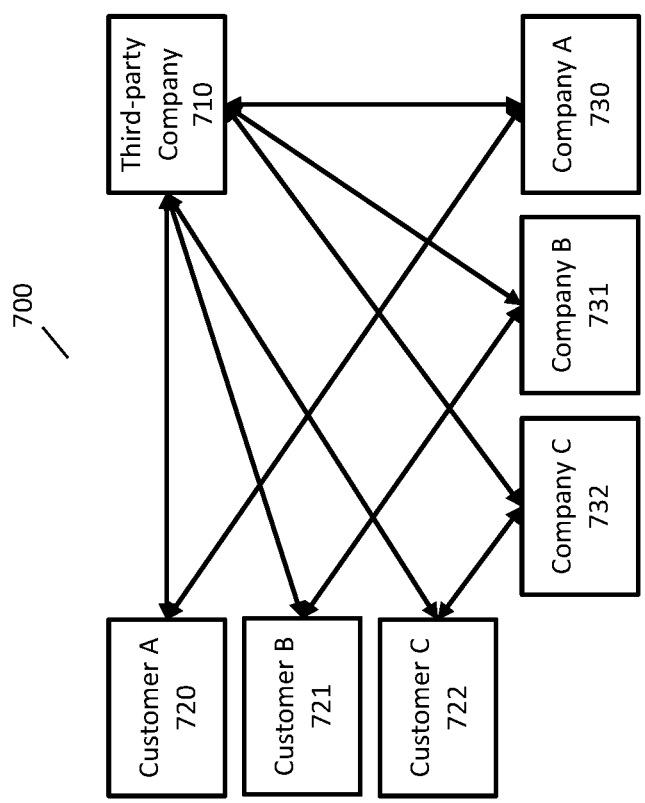
FIG. 7 is an example system for a third-party company to provide services to other companies.

In some implementations, a third-party company may provide services to other companies relating to any of the techniques described herein. For example, a third-party company may provide services to other companies to implement an automated natural language processing system for customers of those companies. For another example, a company may provide a messaging application for use by its customers, and the company may use services of the third-party company to integrate an automated system within the messaging application. A company may find it more cost effective to use the services of the third-party company than to implement its own services. FIG. 7 illustrates an example architecture that may be used by a company to obtain assistance from a third-party company in implementing an automated system.

FIG. 7 illustrates a system 700 that allows third-party company 710 to provide services to multiple companies. In FIG. 7, third-party company 710 is providing services to company A 730, company B 731, and company C 732. Third-party company 710 may provide services to any number of companies.

Customers of each company may communicate with a company where the communications use the services of third-party company 710. For example, customer A 720 may be seeking information from company A 730, customer B 721 may be seeking information from company B 731, and customer C 722 may be seeking information from company C 732. It may or may not be apparent to the customers whether they are using services of third-party company 710.

The network communications between third-party company 710, customers, and companies may be architected in a variety of ways. In some implementations, all communications between a customer and a company may be via third-party company 710 and there may not be any direct connection between the customer and the company. In some implementations, third-party company 710 may communicate with the company but may not communicate directly with the customer. In some implementations, a customer may communicate directly with the company and also third-party company 710.

Where a customer is connected to both a company and third-party company 710, each of the two connections may be used for different kinds of requests. For example, where the customer is interacting with the company in a way that does not require the services of third-party company 710 (e.g., navigating a web site of the company), the customer may use the network connection with the company. Where the customer is interacting with the company in a way that uses the services of third-party company 710, the customer may use the network connection with third-party company.

It may not be apparent to the customer whether the customer is using a network connection with the company or with third-party company 710.

Figure 8:
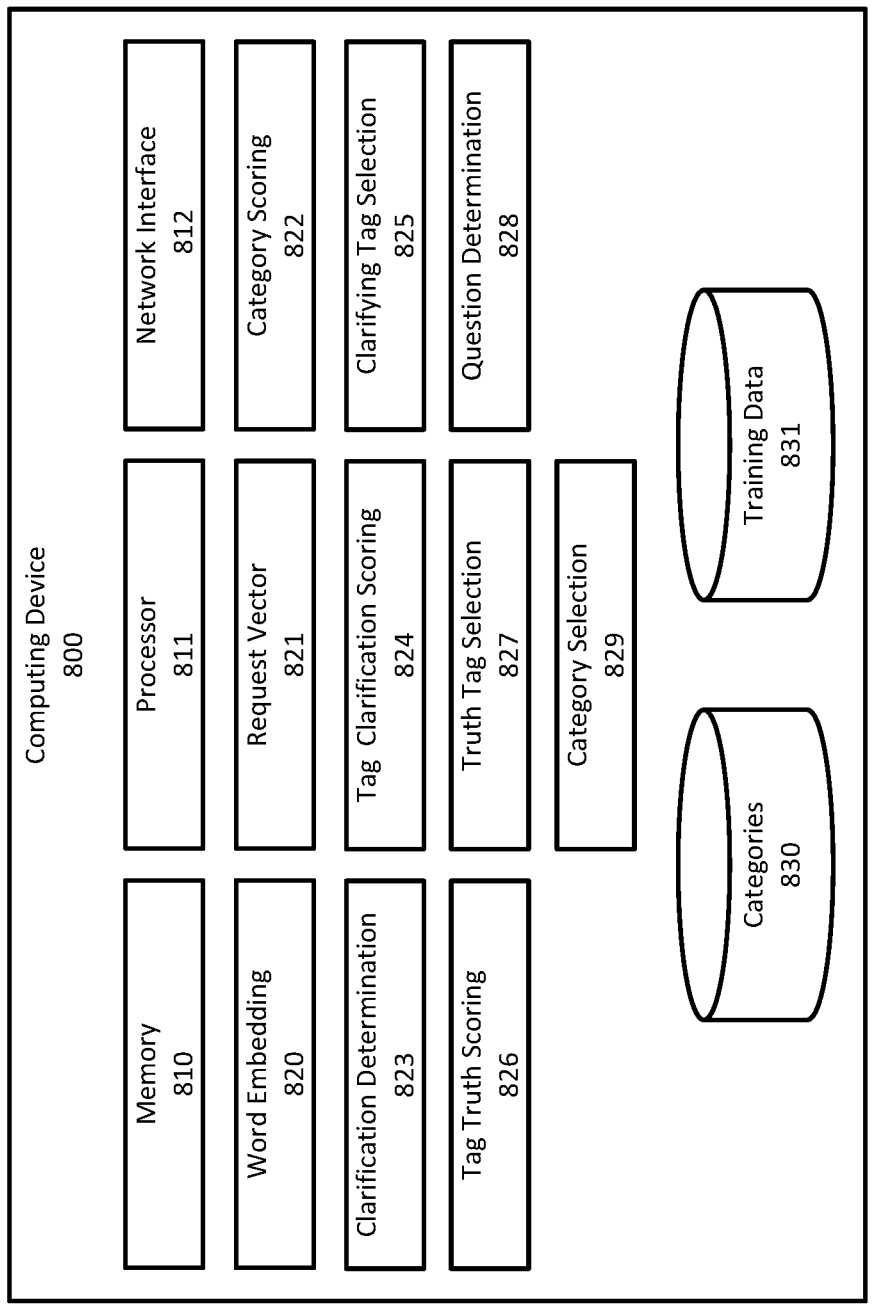
FIG. 8 is an exemplary computing device that may be used to implement an automated system that processes natural language requests.

FIG. 8 illustrates components of one implementation of a computing device 800 for implementing any of the techniques described above. In FIG. 8, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 800 may include any components typical of a computing device, such as volatile or nonvolatile memory 810, one or more processors 811, and one or more network interfaces 812. Computing device 800 may also include any input and output components, such as displays, keyboards, and touch screens. Computing device 800 may also include a variety of components or modules providing specific functionality, and these components or modules may be implemented in software, hardware, or a combination thereof.

Below, several examples of components are described for one example implementation, and other implementations may include additional components or exclude some of the components described below.

Computing device 800 may have a word embedding component 820 that may compute word embeddings or obtain previously-computed word embeddings using any of the techniques described herein. Computing device 800 may have request vector component 821 that may compute a request vector from a user request using any of the techniques described herein. Computing device 800 may have a category scoring component 822 that may compute a category score for a category using any of the techniques described herein. Computing device 800 may have a clarification determination component 823 that may determine if clarification of a user request is needed using any of the techniques described herein. Computing device 800 may have a tag clarification scoring component 824 that may compute a tag clarification score for a tag using any of the techniques described herein. Computing device 800 may have a clarifying tag selection component 825 that may select one or more tags for clarifying a user request using any of the techniques described herein. Computing device 800 may have a tag truth scoring component 826 that may compute a tag truth score for a tag using any of the techniques described herein. Computing device 800 may have a truth tag selection component 827 that may select one or more tags for determining a clarifying question using any of the techniques described herein. Computing device 800 may have a question determination component 828 that may determine a clarifying question using clarifying tags and/or truth tags using any of the techniques described herein. Computing device 800 may have a category selection component 829 that may select one or more categories for responding to a user request using any of the techniques described herein.

Computing device 800 may include or have access to various data stores. Data stores may use any known storage technology such as files, relational databases, non-relational databases, or any non-transitory computer-readable media. Computing device 800 may have categories data store 830 that may be used to store categories for use by an automated system. Computing device 800 may have training data store 831 that may store training data for training any of the neural networks or mathematical models described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network.

The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for clarifying a request received from a user, comprising:
   receiving the request from the user, wherein the request comprises natural language;
   computing a sequence of embedding vectors from text of the request, wherein the embedding vectors represent the text in a vector space;
   processing the sequence of embedding vectors to compute category scores wherein:
      the category scores are determined by processing the sequence of embedding vectors with one or more neural network layers and a classifier,
      each category score corresponds to a category of a plurality of categories and indicates a match between the request and the corresponding category, and
      each category of the plurality of categories corresponds to one or more tags of a plurality of tags;
   determining, using the category scores, to obtain clarification of the request from the user;
   computing tag clarification scores using the category scores wherein each tag clarification score corresponds to a tag of the plurality of tags and indicates a value of the corresponding tag in clarifying the request;
   determining a clarifying question using the tag clarification scores;
   presenting the clarifying question to the user;
   receiving clarification information from the user in response to the clarifying question;
   computing second category scores using the clarification information; and
   selecting a category for the request using the second category scores.

2. The computer-implemented method of claim 1, wherein the plurality of categories correspond to (i) intents of an automated system for processing natural language or (ii) information items of an information retrieval system.

3. The computer-implemented method of claim 1, wherein computing a tag clarification score for a tag comprises computing:
   a probability of the tag being true given the text of the request;
   an entropy of the category scores given the text of the request and the tag being true;
   a probability of the tag being false given the text of the request; and
   an entropy of the category scores given the text of the request and the tag being false.

4. The computer-implemented method of claim 1, wherein determining the clarifying question comprises:
   selecting a tag by comparing the tag clarification scores to a threshold; and
   determining the clarifying question using the selected tag.

5. The computer-implemented method of claim 4, wherein determining the clarifying question comprises determining that the selected tag is multiple choice.

6. The computer-implemented method of claim 1, wherein computing the second category scores comprises processing text corresponding to the clarification information with the neural network.

7. The computer-implemented method of claim 1, wherein the clarification information from the user comprises natural language input and computing the second category scores comprises processing text of the natural language input.

8. The computer-implemented method of claim 1, comprising:
   computing tag truth scores wherein each tag truth score corresponds to a tag and indicates a match between the tag and the request; and
   determining the clarifying question using the tag truth scores.

9. The computer-implemented method of claim 1, wherein the classifier comprises one or more of recurrent neural network layers.

10. A system for clarifying a request, the system comprising:
    at least one server computer comprising at least one processor and at least one memory, the at least one server computer configured to:
      receive the request from a user, wherein the request comprises natural language;
      compute a sequence of embedding vectors from text of the request, wherein the embedding vectors represent the text in a vector space;
      process the sequence of embedding vectors, to compute category scores wherein:
         the category scores are determined by processing the sequence of embedding vectors with one or more neural network layers and a classifier,
         each category score corresponds to a category of a plurality of categories and indicates a match between the request and the corresponding category, and
         each category of the plurality of categories corresponds to one or more tags of a plurality of tags;
      determine, using the category scores, to obtain clarification of the request from the user;
      compute tag clarification scores using the category scores wherein each tag clarification score corresponds to a tag of the plurality of tags and indicates a value of the corresponding tag in clarifying the request;
      determine a clarifying question using the tag clarification scores;
      present the clarifying question to the user;
      receive clarification information from the user in response to the clarifying question;
      compute second category scores using the clarification information; and
      select a category using the second category scores.

11. The system of claim 10, wherein the at least one server computer is configured to determine the clarifying question by selecting a question template from a plurality of question templates.

12. The system of claim 10, wherein the user is a customer of a company seeking customer support from the company.

13. The system of claim 10, wherein the neural network is a recurrent neural network.

14. The system of claim 10, wherein a tag comprises a word or a phrase.

15. The system of claim 10, wherein the at least one server computer is configured to determine to request clarification of the request by comparing a maximum category score to a threshold.

16. The system of claim 10, wherein the at least one server computer is configured to compute a tag clarification score for a tag by computing an expected change in entropy of the category scores.

17. One or more non-transitory, computer-readable media comprising computer-executable instructions that, when executed, cause at least one processor to perform actions comprising:
- receiving a request from a user, wherein the request comprises natural language;
- computing a sequence of embedding vectors from text of the request, wherein the embedding vectors represent the text in a vector space;
- processing the sequence of embedding vectors to compute category scores wherein:
  - the category scores are determined by processing the sequence of embedding vectors with one or more neural network layers and a classifier,
  - each category score corresponds to a category of a plurality of categories and indicates a match between the request and the corresponding category, and
  - each category of the plurality of categories corresponds to one or more tags of a plurality of tags;
- determining, using the category scores, to obtain clarification of the request from the user;
- computing tag clarification scores using the category scores wherein each tag clarification score corresponds to a tag of the plurality of tags and indicates a value of the corresponding tag in clarifying the request;
- determining a clarifying question using the tag clarification scores;
- computing a request vector by processing text of the request with the neural network;
- obtaining for each category of the plurality of categories, a category vector computed by the neural network; and
- performing a computation using the request vector and the category vectors.

18. The one or more non-transitory, computer-readable media of claim 17, wherein:
- the plurality of categories correspond to information items of an information retrieval system; and
- a category vector for a category is computed by processing text of a corresponding information item with the neural network.

19. The one or more non-transitory, computer-readable media of claim 17, wherein a category score for a category is computed by computing a distance between a category vector of the category and the request vector.

* * * * *

UNITED STATES PATENT AND TRADEMARK OFFICE
CERTIFICATE OF CORRECTION

PATENT NO. : 11,610,064 B2
APPLICATION NO. : 16/582700
DATED : March 21, 2023
INVENTOR(S) : Lili Yu et al.

It is certified that error appears in the above-identified patent and that said Letters Patent is hereby corrected as shown below:

On the Title Page

In Column 1, under item (56) "Other Publications", Line 11, delete "Qbject" and insert -- Object -- therefor.

In the Drawings

In sheet 3 of 11, Fig. 2B, delete "Intent Descriptiopn" and insert -- Intent Description -- therefor.

In sheet 5 of 11, Fig. 4, and On the Title Page, the illustrative print figure, reference number 460, delete "clarificaftion" and insert -- clarification -- therefor.

In the Specification

Column 10, Line 16, delete "$f_j$" and insert -- $f_i$ -- therefor.

Column 14, Line 50, delete "may by" and insert -- may be -- therefor.

Column 18, Line 13, delete "may by" and insert -- may be -- therefor.

In the Claims

Column 26, Line 27, Claim 10, delete "vectors, to compare" and insert -- vectors to compare -- therefor.

Signed and Sealed this
Eighteenth Day of June, 2024

Katherine Kelly Vidal
*Director of the United States Patent and Trademark Office*